March 3, 1970     G. W. LISKEY     3,498,115

ELECTRONIC AUTOMOTIVE VIBRATION TESTER

Filed Aug. 22, 1967     2 Sheets-Sheet 1

INVENTOR
GEORGE W. LISKEY
BY
Miller, Morriss, Pappas & McLeod
ATTORNEYS

March 3, 1970 G. W. LISKEY 3,498,115
ELECTRONIC AUTOMOTIVE VIBRATION TESTER
Filed Aug. 22, 1967 2 Sheets-Sheet 2
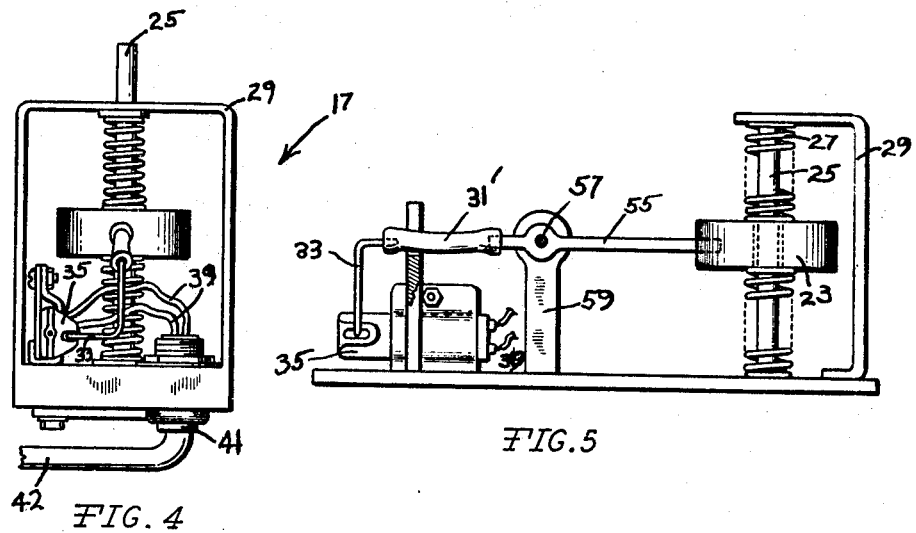
FIG. 4
FIG. 5
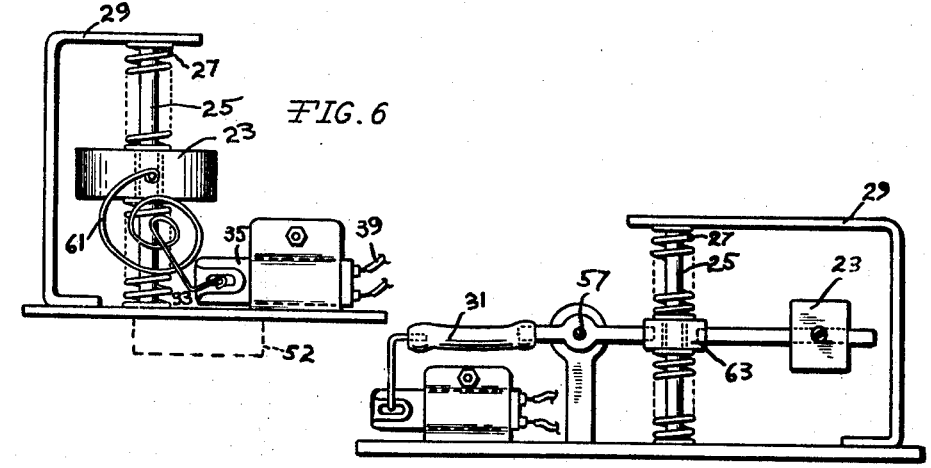
FIG. 6
FIG. 7
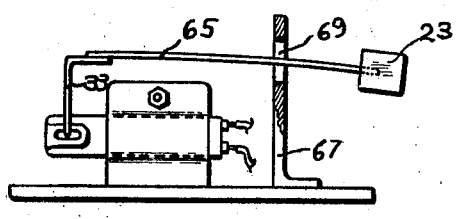
FIG. 8
INVENTOR
GEORGE W. LISKEY
BY
ATTORNEYS

United States Patent Office 3,498,115
Patented Mar. 3, 1970

3,498,115
ELECTRONIC AUTOMOTIVE VIBRATION TESTER
George W. Liskey, 1576 Pontchartrain Drive,
Okemos, Mich. 48864
Filed Aug. 22, 1967, Ser. No. 662,414
Int. Cl. G01n 29/00
U.S. Cl. 73—71.2      4 Claims

ABSTRACT OF THE DISCLOSURE

An electronic vibration tester of the inertial type. A mass is spring suspended in a frame which also supports a phonograph type detector cartridge with a needle arm. The frame is affixed to any element or component of an automobile structure to be tested and vibrates therewith. The mass, being spring suspended, remains substantially motionless and thus vibrates relative to the frame and needle arm of the cartridge. This relative motion is transmitted from the mass to the needle arm via a flexible linkage therebetween. Thus a vibration responsive signal is generated by the cartridge and transmitted by appropriate circuitry to an ammeter calibrated to read vibrational displacement.

Background of the invention

Activity in the automotive art has developed vibration testing devices of several sorts. Some has been directed to the measuring of engine roughness and also frame and wheel vibration. The general area with which the present invention is concerned involves electronic means for measuring the electric signal created by vibration sensing units which convert mechanical vibrations to corresponding electrical vibrations. Such conversion may be accomplished by any suitable known transducer or pick-up, for example a phonograph pick-up, or a microphone capable of responding to vibrations of suitable frequencies. Phonograph cartridge type sensors represent only one means from a large class which includes, for example, detection of the change in capacitance or inductance between vibrating and non-vibrating elements which are not in contact with each other. Still other non-contact means detect vibratory motion by light reflection or by changes in pressure in a fluid bellows, or the like. The present invention involves direct contact apparatus having a suspended mass which remains substantially stationary while a supporting frame is attached to the vibrating component and vibrates with it.

Pertinent art is represented by U.S. Letters Patent Nos. 3,272,005 and 2,920,481, both of which directly or indirectly suggest the measurement of vibration by transducing the motion of a spring suspended inertial mass which remains substantially stationary with respect to the vibrating component being tested.

The first of these patents makes an ancillary reference to amplitude measuring means which include a non-flexible, rigid arm mounted on the engine, with the variations in amplitude traced and recorded directly on a rotating graph drum, or electrically transmitted to other recording means. Non-contact means for measuring amplitude of vibration are also mentioned en passant, i.e., measurement of variations in capacitance, inductance, light reflectance and fluid pressure. The disclosure is directed specifically to the measuring of engine roughness as evidenced by the roll of the engine under its own driving torque.

The second of the cited references describes the use of a directly contacting phonograph type transducer or cartridge pick-up, and requires sophisticated and complicated circuitry for the electronic filtering of extraneous vibration frequencies which do not represent tire "thump."

Summary of the invention

The present invention is directed to a more broadly applicable vibration sensing unit which can detect periodic or single displacements deriving from tire thump, engine roughness vibrations, shock absorber displacement, etc. The structure is designed qualitatively to indicate the order of magnitude of the detected motion without giving a precise isolation of its character or source. Rather, the unit ascertains whether a vibration is within or without acceptable limits and the source is determined by probing with a vibration pick-up unit. No complicated electronic filtering circuitry is necessary because a sufficient filtering action is achieved by a mechanically damping flexible linkage between the inertial oscillatory mass and the sensing cartridge. The unit is constructed in a lightweight, mobile, attachable fashion so that it can be easily moved from point to point on the auto structure, during testing. This "probing" facility is utilized to determine the exact source of a particular objectionable vibration, rather than building complicated electronic gear into the package. Its mobile character gives a road testing ability which also adds to the above-mentioned diagnostic utility.

Accordingly it is an object of the present invention to provide an extremely simple, inexpensive, improved apparatus for the facilitated measurement of automotive vibrations including, but not limited to, vibration of wheels and tires (e.g., due to being bent, out of round, or unbalanced), wheel simmy, engine vibration, and shock absorber function, both in a dynamometer or static testing environment, and also in a road test environment.

Description of the drawings

FIGURE 4 is a side elevational view of the sensing unit of the present invention, including the suspension frame thereof.

FIGURE 5 is a front elevational view of an alternative structure for the sensing unit of the present invention, in which the motion linkage includes a pivotal lever arm.

FIGURE 6 shows another embodiment of the sensing unit of the present invention, in which the motion linkage is a coiled hair spring.

FIGURE 7 is still another alternate structure for the sensing unit of the present invention, in which the structure is similar to that shown in FIGURE 5, with the exception that the oscillating mass is disposed on the pivot arm outboardly of the suspension spring.

FIGURE 8 is a final alternative structure of the sensing unit of the present invention, in which the oscillating mass motion is directly transmitted to the sensing cartridge through a stiff spring wire.

Description of preferred embodiment

Figure 1:
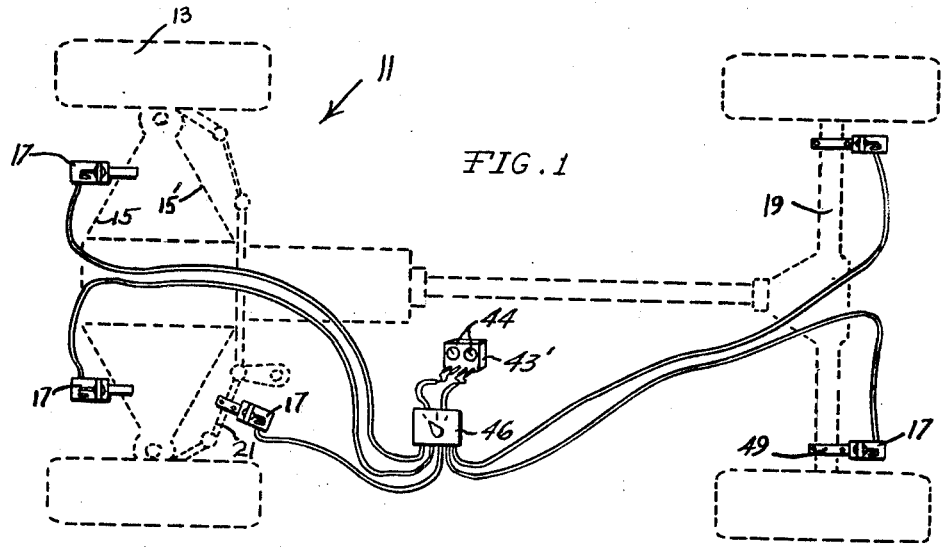
FIGURE 1 is a top plan view of the entire system of the present invention as applied to wheel suspension assemblies of an automobile.

To appreciate the nature of the invention it is best first to view the entire system into which the invention is imbedded. FIGURE 1 represents a typical arrangement in which the present invention is placed. It includes an automotive structure 11 with tires 13 mounted on wheels (not shown). The wheels are journalled to a bearing assembly (not shown) at the outboard ends of the wheel suspension arms 15 and 15'. Sensing units 17 are seen placed at various positions on the auto frame, i.e. on the front suspension arms 15, the rear axles 19, and the control arm 21. This stationing of the various vibration sensing units 17 is arbitrary, and merely represents stations at which readings are often taken. Naturally, other elements could be tested, for example engine components, body components, etc.

Figure 2:
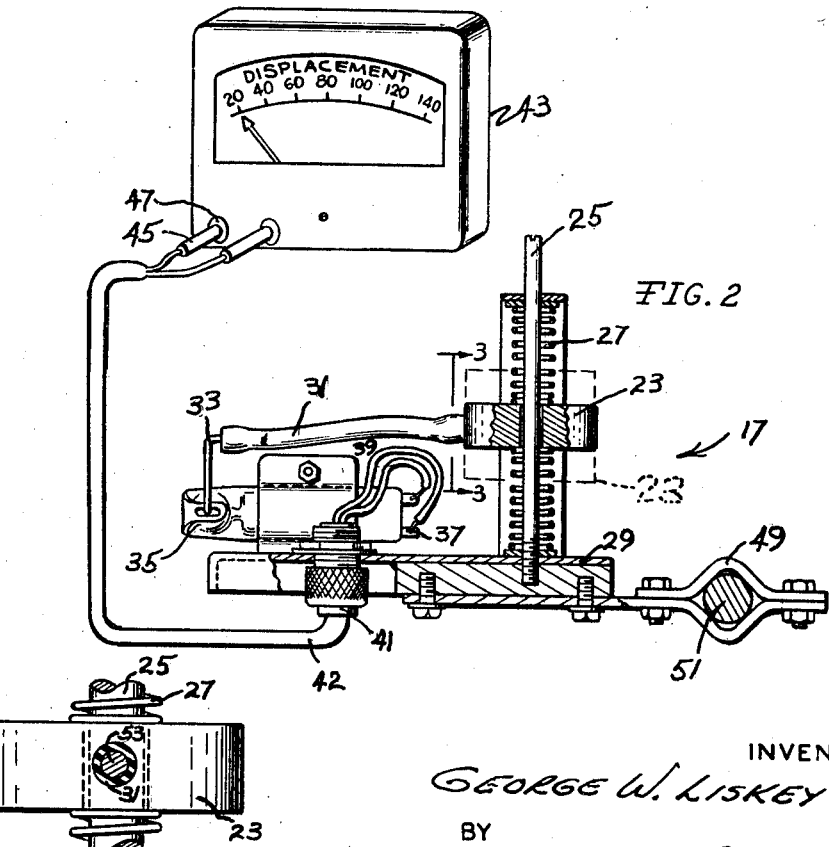
FIGURE 2 is a front elevational view of the vibration sensing or transducing unit of the present invention, with portions thereof broken away, and showing electronic means for visual perception of the vibration responsive signals generated by the sensing unit. Also shown in dashed lines are alternative positions of the inertial mass during displacement thereof.

FIGURE 2 shows the precise structure of the sensing unit 17 which includes an inertial mass 23 disposed for horizontal oscillation upon shaft 25 and centered by suspension springs 27 which are coiled over the shaft 25 between either side of the weight 23 and the suspension frame 29. The weight or mass 23 is shown in a sliding, lubricated fit over the shaft 25. A more refined bearing contact is obtainable by inclusion of a ball bearing mechanism (not shown) around the weight aperture, for rolling motion on the shaft 25. The weight 23 is provided on its radius with a short radial extension stub over which is slipped the flexible tubular link 31. The link is similarly attached at its other end to the transducer arm 33. As shown, this arm 33 is the needle arm of a phonograph type cartridge pick-up 35 containing a salt crystal, or the like, which generates an electric signal in response to vibration of the arm 33. This signal is picked up from contact posts 37 by the electrical leads 39. The leads 39 feed to the outside of the frame 29 via the thread connected conduit 41, and thence proceed, inside the cover 42, to the displacement meter 43 to which they connect by plugs 45 inserted into jacks 47. FIGURE 1 shows an alternate construction of displacement meter, which includes twin indicators simultaneously in circuit with a selected pair of sensing units. This connection is especially useful in performing road testing of shock absorbers, to be subsequently described. Switching means 46 are included to give easy selection of sensor pairs, and also an intermediate connection to a single sensor unit.

The meter box is a self-contained, battery operated DC microammeter package with current amplifying and rectifying means. Thus the entire unit is completely portable for easy transportation and ideally suited to road testing of automotive equipment. Of course the unit can be easily provided with transformer and rectifier circuits for operation from a normal 110 volt A.C. power source. Lead wires to the box are normally clipped to a bumper or the like, especially during road testing, to avoid snagging or chafing of a loop of loose wire on moving or rotating parts, or on an external road obstruction.

The suspension frame 29 is provided with a universal clamp 49 so that the instrument may be attached at any selected orientation to a selected auto part 51. The universal clamp is especially useful where a unit is to be connected in a confined space. Preferably the unit is attached with the shaft 25 in a horizontal position, since this places the twin springs 27 in equal static tension for even greater efficiency. Attachment and detachment can be alternatively secured by magnetic means 52, shown in the phantom line of FIGURE 6.

Figure 3:
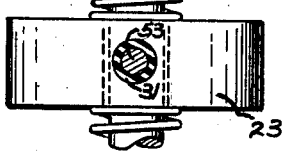
FIGURE 3 is a detailed view of the inertial oscillatable mass of the sensing unit of the present invention, taken on section lines 3—3 of FIGURE 2 and shows in cross section the connection of the mass to the flexible tubular linkage which transmits the mass motion to a signal generating element.

FIGURE 3 shows the sectional detail of the connection of the rubber tubular link 31 to the weight stub 53; and FIGURE 4 shows an end elevation view of the oscillatory sensing unit as seen in FIGURE 2.

FIGURE 5 represents an alternative structure in which the oscillating weight 23 is suspended at the outboard end of the rigid pivot arm 55. The arm 55 has a free swinging fulcrum 57 atop the fulcrum post 59, and its inboard end is connected to the cartridge arm 33 by a modified length of flexible tubing 31'.

FIGURE 6 represents another alternative structure in which the transmission of oscillatory motion from the weight 23 to the cartridge arm 33 is accomplished by a flexible coiled hair spring 61.

In FIGURE 7 is seen still another alternative structure which is quite similar to the structure of FIGURE 5, except that the oscillatory mass 23 is adjustably disposed along the lever arm 55, and is not journalled to the travel shaft 27. The lever arm 55 is broken somewhere between its outboard end and the fulcrum 57 for the interposition of a travel sleeve 63, which has no substantial weight but merely serves as a guiding and centering element between the springs 27 on the shaft 25. The mass 23 may be adjusted along the lever arm 55, or even replaced by a larger or smaller mass, to give a selected degree of sensitivity to the composite system.

Finally in FIGURE 8 is seen an alternative structure from which has been eliminated the travel shaft and springs and in which the oscillating weight 23 is directly cantilevered to the cartridge arm 33 by a relatively stiff wire spring 65. A plate 67 with guide aperture 69 is also shown.

Operation

In operation the unit is generally used for measurement of two separate types of displacement, first a repeated or vibrational type displacement, and second a single motion displacement such as that resulting from an automobile wheel striking an obstruction as a railroad track or the like. A typical illustration of vibrational measurement is the wheel balance check. A typical situation of single displacement measurement is a shock absorber test in which the condition of the shock may be determined by measuring the amplitude of displacement under perturbation from a road irregularity or a known obstruction.

Operation of the unit for vibrational measurement will first be described. As already mentioned vibrational testing is usually encountered during a wheel balance examination. Weights may be added to correct static unbalance of a wheel. However the static unbalance of a wheel or tire often is not the source of the offensive vibration. For example the vibration may be due to an out-of-round wheel or an out-of-round tire, or the like. Checking this condition with the herein described apparatus, after the tire has been statically balanced, proves that the actual cause of the continuing vibration is not static unbalance but rather an eccentricity in the rotating structure. The testing unit is provided with quick attachment means (e.g. magnets) so that it can quickly be moved from place to place along the dynamic drive chain of an automobile, to pin point the trouble spot. For example a vibration could be occurring in an unbalanced driveshaft, or at the outboard end of a rear axle shaft, or in the hub or the brake drum of the wheel, etc. With the easily moved self-contained unit as presented in the present invention, checking can take place quickly from point to point and the precise location of the source of trouble can be quickly located. Thus the automobile can be mounted on a dynamometer to spin the wheels with the car in place. Then, point to point checking is conducted for conditions ranging from engine or drive shaft unbalance to low speed tire thump, the latter condition being usually due to a heavy section in the tire, i.e. heavy rubber as in an area of extra heavy lap.

The present unit gives a visual impression, from the needle deflection observed as to whether a serious condition of vibration exists. The alternating signal from the phonograph cartridge is rectified and then fed to the displacement needle or gage on the DC microammeter. The rectified alternating signal or wave form causes the deflecting needle to stabilize at a position on the meter corresponding to a measurement of the effective amperage value which lies somewhere between half and full value of the peak amplitude. It should be understood that the present device is primarily intended for qualitative measurement of vibrations coming from a variety of causes, and is not intended to give a sophisticated, qualitative, isolation of a particular vibrational frequency or character, as for example does one of the units of the previously cited prior art. Special, delicate and expensive circuitry might be designed for several distinct conditions, e.g. tire thump which occurs typically at low speed or 20–30 miles per hour (m.p.h.); wheel balance at 50–70 m.p.h.; out-of-round tramp at 40–70 m.p.h.; abnormal tire stretch at 60–90 m.p.h.; or faulty shock displacement at any speed. However, the present apparatus employs a single design for all the above conditions and is thereby greatly simplified, and no particular complicated circuitry is necessary to filter out extraneous or random vibrations. The flexible tubular link 31 appears to account for sufficient frequency filtering to give very serviceable readings. No other explanation is available for this stabilizing effect.

Thus very high, very low, or other irregular frequencies are sufficiently choked out by the flexible non-metallic linkage between the oscillating mass 23 and the mechanico-electrical sensing device (i.e. the phonograph cartridge). The result, although not completely explainable in terms of the dynamics of the system, is that vibrations of the types previously described are satisfactorily detected by readings which are interpretable by ordinary personnel. Deflections of the displacement indicator can easily be compared to known values for normal conditions, and thus unskilled operators can determine the existence of dangerous or annoying vibrations, and pinpoint the source thereof.

The second utilization for the present apparatus is that of measuring amplitude of displacement of moving suspensions i.e. front or rear wheels. Normally such utilization is conducted as a shock absorber test. In this case the sensing unit is placed sufficiently close on the suspension near the shock absorber and the wheel is rotated and then displaced in a vertical direction. The single displacement causes a single deflection of the oscillatable mass which generates a corresponding single deflection of the indicator needle of the displacement meter. The peak position of the needle is easily perceived and recorded. This displacement may then be compared with known displacement values from which the condition of the shock absorber can be easily judged.

It should also be pointed out that the simplicity of the present unit, and its portability and easy attachability, make it ideally suitable for road use during the above described vibratory and shock absorber testing procedures. It is especially desirable to perform a road testing of wheel balance since spinning the wheels on a dynamometer in the garage does not give the identical environment encountered on the road where tires tend centrifugally to expand, in a radial direction, with a corresponding decrease in their width, and undergo other expansion changes in the heating of the area inside the tire. Also interference effects are received from other oscillating members of the automobile which may be static in the garage testing condition. It is well known that often defects which may prove extremely annoying or dangerous on the road are difficult to detect in the garage testing situation.

The unit of the present invention can be mounted to the appropriate test element of the automotive structure, with the microammeter indicator placed inside the automobile or truck where it is visible to the operator, and thus only one person is necessary to make the entire test. The positioning of the indicator remotely from the test unit also provides an attractive feature for "automotive clinics," i.e. diagnostic centers which are becoming increasingly numerous throughout the country. Here the auto owner drives his car into the test unit, and, from a safe customer viewing station he may himself watch the indicators while the car is tested. This personal, graphic demonstration has been received with approval both by automotive diagnostic centers and their customers.

Road testing, which is made possible by the present invention, is desirable for reasons other than those previously mentioned. For example a particular vibratory condition known as out-of-round brake chatter is best tested by driving an auto to an appropriate high speed, say 70 to 80 miles per hour, and slamming on the brakes. The tester will locate the wheel that chatters, by its vibration. Another condition which is often best checked on the road is shock absorber dampening and serviceability. Such a test may be performed on dynamometer rolls using an eccentric or other projection for thrusting the wheels upward at each revolution of the roll. However, the wheels must be tested one at a time, and thus the tester must make some determinative computations, or at least a comparison with ideal known values for the particular shock absorber on the particular auto. A simpler procedure is simply to compare the performance of two shock absorbers with one another, on the same vehicle. Thus the two rear shocks may be compared, and if they are substantially the same, it may be concluded that neither has suffered any serious damage or deterioration. In this method the automobile is driven over a road projection at a selected speed, with a test unit attached to each of the rear shocks and also connected to a separate displacement indicator inside the automotive cab. Such an arrangement is shown in FIGURE 1, in which the indicating unit 43′ is provided with the double indicators 44 and switch means 46, for respectively connecting to the rear wheels, or alternatively the front wheels. When the vehicle is driven over a known road projection the indicator readings are visually compared at the time of impact. If a sufficient deviation between the two readings is observed, it may be assumed that the shock of the higher amplitude displacement, i.e., the higher indicator reading, is defective because of its insufficient dampening action against the displacement of the suspension unit.

A third switch position is shown on the switching means 46 to allow connection to a single sensing unit in any other selected position on the automobile. Of course any number of switch positions could be provided so that switching could be accomplished between any selected combinations of sensing units.

It has been found that, in actual use, the spring centered and suspended inertial mass, in combination with the flexible tubular, synthetic or rubber link, gives very definite readings in connection with the vibratory and displacement actions previously described. In addition, the unit is sufficiently simple to be manufactured as a self-contained unit for wide distribution for road testing, where present garage type testing units require dynamometer rolls and other necessary associated drive equipment and shock test eccentric apparatus. Thus with wider distribution of simple equipment such as that of the present invention, road testing will become more accessible at lower cost, and may be even utilized by police or other operators of compulsory or voluntary check point stations on road, streets and highways. Such a development would lead to greater efficiency of automobile operation, and notably could result in greatly improved safety on the highway.

From this description of an operative embodiment of my invention, others skilled in the art will find apparent modifications, improvements, and substitutions, all of which are to be included within the spirit of the invention, the scope of which is to be limited only by the hereinafter appended claims.

I claim:

1. Automotive vehicle vibration testing apparatus comprising, in combination, a frame, a phonograph cartridge type vibration sensor fixed to said frame, said sensor including an oscillatable arm, mounting means fixed to said frame and adapted to be releasably secured to selected elements of an automotive vehicle, a weight, a pair of axially spaced coil springs carried by said frame and resiliently suspending said weight for dampened oscillation relative to said frame, an elongate, resilient, flexible member, one end portion of said member being fixed to said arm, the other end portion of said member being connected to said weight whereby said member simultaneously damps and transmits to said arm frequency filtered oscillations of said weight relative to said frame, and means for electrically measuring the amplitudes of sensor signals generated by oscillation of said arm.

2. The combination as set forth in claim 1 including an elongate shaft fixed to said frame, said weight being slidably mounted on said shaft, said coil springs encompassing said shaft on opposite sides of said weight and being compressible between one side of said weight and said frame upon vibration of said weight relative to said frame.

3. The combination as set forth in claim 1 wherein said weight is carried by an elongate element pivotally mounted on said frame, said other end portion of said member being connected to said element.

4. The combination as set forth in claim 1 wherein said member is formed of non-metallic material and is tubular in transverse cross section.

References Cited

UNITED STATES PATENTS

| 2,839,922 | 6/1958 | Manildi | 73—517 XR |
| 2,914,940 | 12/1959 | Elliott et al. | 73—146 |
| 2,933,715 | 4/1960 | Beuermann | 73—71.2 XR |

FOREIGN PATENTS

| 597,538 | 5/1960 | Canada. |
| 1,085,619 | 2/1955 | France. |

JERRY W. MYRACLE, Primary Examiner